(12) United States Patent
Ikeda et al.

(10) Patent No.: US 7,734,612 B2
(45) Date of Patent: Jun. 8, 2010

(54) INFORMATION SEARCH APPARATUS, INFORMATION SEARCH METHOD, INFORMATION SEARCH PROGRAM, AND GRAPHICAL USER INTERFACE

(75) Inventors: Takuo Ikeda, Tokyo (JP); Nobuki Furue, Tokyo (JP); Wataru Tajika, Tokyo (JP); Takashi Kitao, Tokyo (JP); Yuhei Kikuchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 158 days.

(21) Appl. No.: 11/623,938

(22) Filed: Jan. 17, 2007

(65) Prior Publication Data

US 2007/0179938 A1    Aug. 2, 2007

(30) Foreign Application Priority Data

Jan. 27, 2006    (JP)    .............................. 2006-019290

(51) Int. Cl.
   *G06F 7/00*    (2006.01)
(52) U.S. Cl. ........................ 707/706; 707/707; 707/722
(58) Field of Classification Search ............... 707/1–10, 707/104
   See application file for complete search history.

(56) References Cited

U.S. PATENT DOCUMENTS

| | | | | |
|---|---|---|---|---|
| 2002/0063735 | A1* | 5/2002 | Tamir et al. | 345/745 |
| 2003/0033300 | A1* | 2/2003 | Bergman et al. | 707/5 |
| 2003/0078914 | A1* | 4/2003 | Witbrock | 707/3 |
| 2003/0217052 | A1* | 11/2003 | Rubenczyk et al. | 707/3 |
| 2005/0154716 | A1* | 7/2005 | Watson et al. | 707/3 |
| 2006/0047649 | A1* | 3/2006 | Liang | 707/4 |

FOREIGN PATENT DOCUMENTS

| | | |
|---|---|---|
| JP | 10-49537 | 2/1998 |
| JP | 2002-7476 | 1/2002 |
| JP | 2004-152110 | 5/2004 |
| JP | 2004-335098 | 11/2004 |

OTHER PUBLICATIONS

U.S. Appl. No. 11/625,077, filed Jan. 19, 2007, Ikeda, et al.
Wataru Tadika, et al., "IR Interface Based on Changing "Field" in Virtual Space", Information Processing Society of Japan symposium series, vol. 2000, No. 14, Dec. 6, 2000, pp. 275-280.

* cited by examiner

Primary Examiner—Mohammad Ali
Assistant Examiner—John P Hocker
(74) Attorney, Agent, or Firm—Oblon, Spivak, McClelland, Maier & Neustadt, L.L.P.

(57) ABSTRACT

Disclosed herein is an information search apparatus includes: search means configured to search for an associated object associated with a specified search source object; associated object display means configured to display a searched associated object onto a display screen; display count setting object display means configured to display a display count setting object for setting the number of the associated objects to be displayed on the display screen onto the display screen; and associated object display count control means configured to, if a setting of the number of associated objects has been changed by an operation executed on the display count setting object, adjust the number of associated objects displayed on the display screen in accordance with the changed setting and display the resultant number of associated objects.

11 Claims, 8 Drawing Sheets

| Playlist | Track name | Time | Artist | Album name | Genre |
|---|---|---|---|---|---|
| ALL | Dream Gypsy | 9:16 | Bill Evans | Waltz for Debby | Jazz |
| Rock | | | | | |
| Cool | Waltz for Debby | 4:11 | Bill Evans | Waltz for Debby | Jazz |
| 103B | Dream Gypsy | 9:16 | Bill Evans | Waltz for Debby | Jazz |
| 103C | Iong | 7:02 | Bill Evans | Waltz for Debby | Jazz |

FIG. 6

| Playlist | Track name | Time | Artist | Album name | Genre |
|---|---|---|---|---|---|
| ALL | Waltz for Debby | 4:11 | Bill Evans | Waltz for Debby | Jazz |
| Rock | ~~Dream Gypsy~~ | ~~9:16~~ | ~~Bill Evans~~ | ~~Waltz for Debby~~ | ~~Jazz~~ |
| Cool | Iong | 7:02 | Bill Evans | Waltz for Debby | Jazz |
| 103B | Music01 | 5:16 | test | sound test | Rock |
| 103C | Music02 | 3:36 | test | sound test | Rock |

SCROLL UPWARD

INFORMATION SEARCH APPARATUS, INFORMATION SEARCH METHOD, INFORMATION SEARCH PROGRAM, AND GRAPHICAL USER INTERFACE

CROSS REFERENCES TO RELATED APPLICATIONS

The present invention contains subject matter related to Japanese Patent Application JP 2006-019290 filed in the Japanese Patent Office on Jan. 27, 2006, the entire contents of which being incorporated herein by reference.

BACKGROUND OF THE INVENTION

1. Field of the Invention

The present invention relates to an information search apparatus, an information search method, an information search program, and a graphical user interface, and more particularly, to an information search apparatus, an information search method, an information search program, and a graphical user interface that are suitably applicable in searching associated objects and presenting the searched objects to a user.

2. Description of the Related Art

Information search processing is widely known in which an information processing apparatus, such as a computer, is used to search masses of information for associated information and extract the searched associated information.

In such information search processing, a keyword set by the user is matched against a character string (an object name or attribute for example) belonging to a candidate object subject to search, for example, to present candidate objects highly associated with the keyword to the user as associated objects.

In such information search processing, many associated objects may be searched depending on the setting of keywords or the number of candidate objects subject to selection, for example. Therefore, it is a general practice in information search processing to make each user set the number of displays of associated objects, thereby presenting only the number of associated objects desired by the user.

However, in the above-mentioned example, the user have to set the number of displays of associated objects in advance and, if the user wants of change the number of displays, discontinue an information search operation to set the number of displays again, which hampers the ease of operation.

SUMMARY OF THE INVENTION

Therefore, the present invention addresses the above-identified and other problems associated with related-art methods and apparatuses and solves the addressed problems by providing an information search apparatus, an information search method, an information search program, and a graphical user interface that are significantly enhanced in the ease of operation as compared with related-art technologies.

According to an embodiment of the present invention, there is provided an information search apparatus. This information search apparatus has a search section configured to search an associated object associated with a specified search source object; an associated object display section configured to display a searched associated object onto a display screen; a display count setting object display section configured to display a display count setting object for setting the number of the associated objects to be displayed on the display screen onto the display screen; and an associated object display count control section configured to, if a setting of the number of associated objects has been changed by an operation executed on the display count setting object, adjust the number of associated objects displayed on the display screen in accordance with the changed setting and display the resultant number of associated objects.

According to a further embodiment of the present invention, there is provided an information search apparatus. This information search apparatus has a search section configured to search an associated object in accordance with a degree of association with a specified search source object; a display section configured to display the searched associated object and a degree-of-association change object for changing the degree of association onto a display screen; a degree-of-association change section configured to change the degree of association in accordance with an operation executed on the degree-of-association change object; and a display control section configured to adjust the number of the associated objects in accordance with the change of the degree of association by the degree-of-association change section.

According to a still further embodiment of the present invention, there is provided an information search method. This information search method has the steps of: searching for an associated object associated with a specified search source object; displaying a searched associated object onto a display screen; displaying a display count setting object for setting the number of the associated objects to be displayed on the display screen onto the display screen; and adjusting, if a setting of the number of associated objects has been changed by an operation executed on the display count setting object, the number of associated objects displayed on the display screen in accordance with the changed setting and displaying the resultant number of associated objects.

According to a yet further embodiment of the present invention, there is provided an information search program. This information search program makes an information processing apparatus execute the steps of: searching for an associated object associated with a specified search source object; displaying a searched associated object onto a display screen; displaying a display count setting object for setting the number of the associated objects to be displayed on the display screen onto the display screen; and adjusting, if a setting of the number of associated objects has been changed by an operation executed on the display count setting object, the number of associated objects displayed on the display screen in accordance with the changed setting and displaying the resultant number of associated objects.

According to a still further embodiment of the present invention, there is provided a graphical user interface for searching for an associated object associated with a search source object and displaying the searched associated object. This graphical user interface has the steps of: searching for an associated object associated with a specified search source object; displaying a searched associated object onto a display screen; displaying a display count setting object for setting the number of the associated objects to be displayed on the display screen onto the display screen; and adjusting, if a setting of the number of associated objects has been changed by an operation executed on the display count setting object, the number of associated objects displayed on the display screen in accordance with the changed setting and displaying the resultant number of associated objects.

As described above and according to the embodiments of the present invention, an associated object associated with a specified search source object is searched for, the searched associated object is displayed on a display screen, a display count setting object for setting the number of associated objects to be displayed on the display screen is displayed on the display screen along with the associated object, and, if the setting of the number of associated objects has been changed by an operation done on the display count setting object, the number of associated objects displayed on the display screen is increased or decreased in accordance with the changed setting and the resultant number of associated objects is displayed on the display screen. This configuration according to the embodiments of the present invention provides an information search apparatus, an information search method, an information search program, and a graphical user interface that are significantly enhanced in the ease of operation of information search processing in related art.

The above and other features and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

This invention will be described in further detail by way of embodiments thereof with reference to the accompanying drawings.

(1) Configuration of Personal Computer

Figure 1:
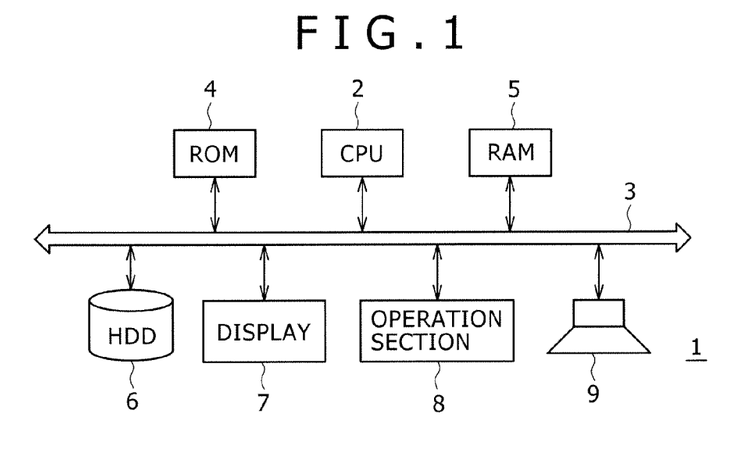
FIG. 1 is a block diagram illustrating an exemplary hardware configuration of a personal computer.

Now, referring to FIG. 1, there is shown an exemplary configuration of a personal computer that provides an information search apparatus for realizing a graphical user interface according to the present invention. This personal computer, denoted by reference numeral 1, has a CPU (Central Processing Unit) 2 for totally controlling the information search apparatus in its entirety, to which a ROM (Read Only Memory) 4, a RAM (Random Access Memory) 5, a HDD (Hard Disk Drive) 6, a display 7, an operation section 8, and a loudspeaker 9 are connected through a bus 3. Actually, the operation section 8 is configured by a keyboard and a mouse.

The HDD 6 stores a basic program (or an operating system) and various application programs. When the personal computer 1 is started up, the CPU 2 reads the basic program from the HDD 6 into the RAM 5 in which to execute the basic program and, under the control of this basic program, reads application programs from the HDD 6 into the RAM 5 in which to execute the application programs, in accordance with user operations done through the operation section 8, showing processing results on the display 7.

(2) Information Search Method According to the Invention (2-1) Configuration of Music Player The following describes an information search method according to the present invention by use of a music player as an example. To be more specific, the information search method according to the invention is applicable to the processing of searching for associated information in a file management program, the processing of searching for associated information in file selection screens of various programs, and various other search processing operations. In what follows, an example will be described in which the present invention is applied to a music player for reproducing music content (hereafter referred to also as music, music data, and so on), for the user of the music player to select desired music from among many pieces of music content. This music player is started up when the CPU 2 reads a music player program that is an information display program, one of application programs, from the HDD 6 into the RAM 5 in which to execute the music player program.

Figure 2:
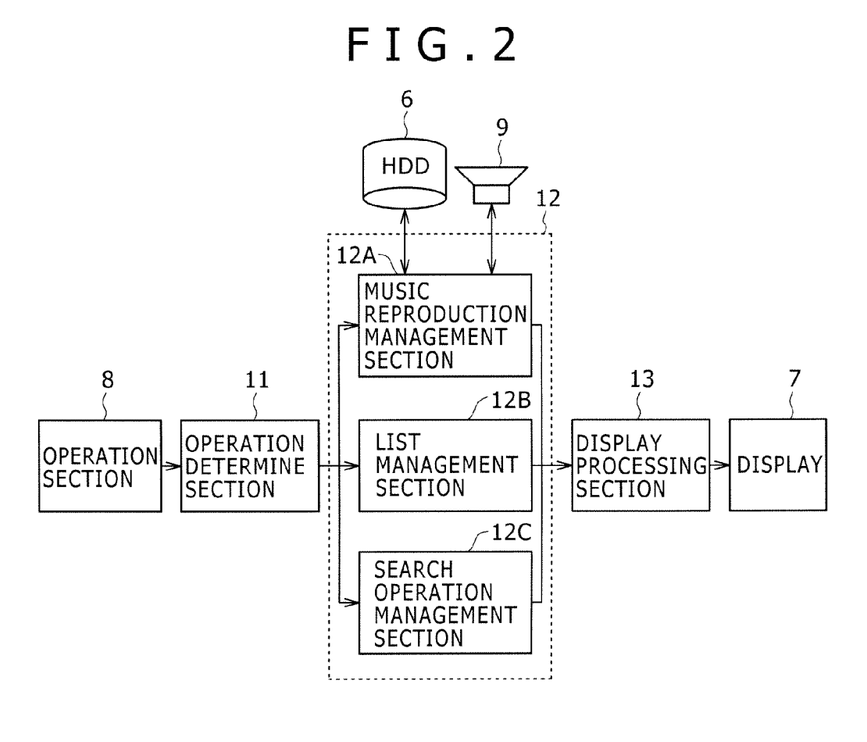
FIG. 2 is a block diagram illustrating an exemplary software configuration of a music player.

As shown in FIG. 2, the music player program accepts, at an operation determine section 11, an input signal S1 entered by the user through the mouse or keyboard of the operation section 8, generates a various operation signal S2 corresponding to the input signal S1, and supplies the generated various operation signal S2 to an operation execution section 12.

The operation execution section 12 includes: a music reproduction management section 12A; a list management section 12B; and a search operation management section 12C; which execute operations in accordance with the operation signal S2. For example, the music reproduction management section 12A reproduces the music content stored in the HDD 6 and outputs the reproduced music content from the loudspeaker 9 in accordance with various music reproducing operations by the user, such as play and rewind, and supplies the display information associated with the reproduction done to the display processing section 13.

The list management section 12B executes the processing of playlist creation and deletion in accordance with various list operations, such as music content list display and playlist creation by the user, and supplies the display information associated with these processing operations done to the display processing section 13. For example, the list management section 12B temporarily stores a selected objected selected by the user into the RAM 5 and generates the display information for displaying the selected object as a cubic display based on multiple layers to be described later, supplying the generated display information to the display processing section 13. If a command for deleting a selected object is entered by the user, the list management section 12B deletes the specified selected object from the RAM 5 and supplies the display information for changing the display of that selected object in cubic display to the display processing section 13. In addition, if a command for creating a playlist is entered by the user, the list management section 12B creates a playlist on the basis of the selected object stored in the RAM 5 and supplies the display information for displaying the creation of a playlist as a cubic display based on multiple layers to the display processing section 13.

The search operation management section 12C searches the music content stored in the HDD 6 for the associated music and supplies the display information about search results to the display processing section 13 in accordance with a music content search operation done by the user. For example, in this music search operation, the search operation management section 12C searches the HDD 6 for the associated music associated with a specified selected object and temporarily stores the searched associated music into the RAM 5. Also, the search operation management section 12C supplies the display information for displaying a display count setting object for setting the number of displays of the associated music to be displayed on the display 7 in accordance with the degree of association to the display processing section 13. Then, receiving the entered degree of association from the operation determine section 11 via the display count setting object, the search operation management section 12C supplies the display information for displaying the associated music in the number corresponding to that degree of association to the display processing section 13.

To be more specific, the search operation management section 12C extracts the associated music from the associated music stored in the RAM 5 by use the entered degree of association as a threshold value and generates the display information for displaying the extracted associated music as a search result. Thus, setting a threshold value for associated music extraction on the basis of the degree of association allows the increase in the number of displays when the degree of association is set relatively high and the decrease when the degree of association is set relatively low.

On the basis of the display information supplied from the music reproduction management section 12A, the list management section 12B, and the search operation management section 12C, the display processing section 13 determines the display contents by use of a cubic display based on multiple layers to be described later, generates a video signal S3 on the basis of the determined display contents, and displays this video signal on the display 7.

(2-2) Screen Configuration of Music Player

Figure 3:
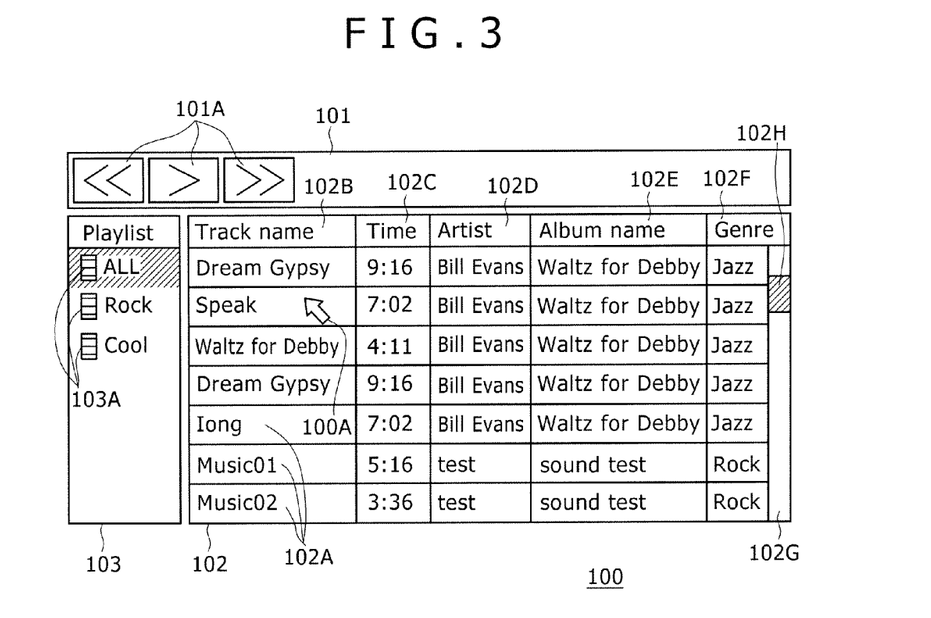
FIG. 3 shows an exemplary music player screen configuration.
Figure 4:
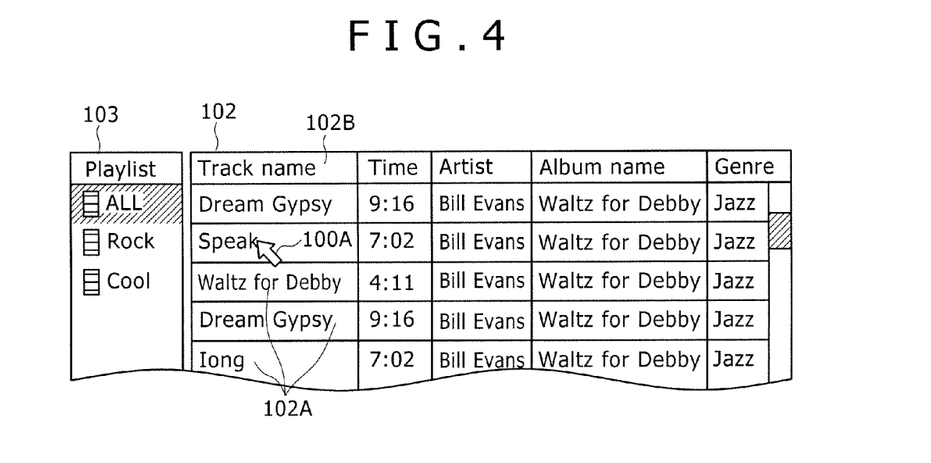
FIG. 4 shows an exemplary screen display for describing a music selecting operation.

Referring to FIG. 3, there is shown a configuration of a main screen 100 to be displayed on the display 7 by the music player, in which a toolbar 101 is located on top of the screen, a list display section 102 to the lower right side of the toolbar 101, and a playlist display section 103 on the left of the list display section 102.

A mouse pointer 100A that moves around on the main screen 100 as operated by the user through the mouse is also shown on the main screen 100. This mouse pointer 100A allows, by clicking or double-clicking mouse's left-button or right-button, the music player to execute a function corresponding to a location (a button, an icon, or a character string, for example) at which the mouse pointer A is located on the screen.

The toolbar 101 shows a plurality of operating buttons 101A for the user to enter various operations, such as music reproduction and skip, for example. It should be noted that the display contents of each operator button 101A change from time to time in accordance with operational states of the music player.

The list display section 102 shows music texts 102A indicative of information about each piece of music stored in a music library in the HDD 6, in lines in up and down directions. Each music text 102A is configured by five types of information, track name 102B, time 102C, artist 102D, album name 102E, and genre 102F.

At the right end of the list display section 102, a scroll bar 102G is arranged, which scrolls the display contents of the list display section 102 up and down when the user drags a scroll pointer 102H up and down by use of the mouse pointer 101A, thereby displaying the unseeable portion of the music text 102A.

When making music reproduction by the music player, the user can operate the mouse pointer 100A to double-click the desired music text 102A (hereafter referred to also as "double-click music") on the list display section 102 with the left-button for direct reproduction or single-click a desired music text 102A (hereafter also referred to as "single-click music") with the left-button and then click the play button on the tool bar, thereby reproducing desired piece of music.

On the other hand, the playlist display section 103 shows a playlist icon 103A indicative of a playlist in which a plurality of pieces of music to be reproduced are listed.

The user can select a desired piece of music from a plurality of music texts 102A as a candidate object displayed on the list display section 102 to enter the selected music into a desired existing playlist as the registered music as a selected object or create a new playlist. Alternatively, the user can delete any registered music from an existing playlist.

Next, when a reproducing operation is done by the user with a user-desired playlist specified, the music player sequentially reproduces the pieces of music entered in that playlist. It should be noted that, with this music player, a playlist called "ALL" list that includes all pieces of music as registered music is arranged beforehand, so that the playlist function can be executed by use of this "ALL" list without user's creating a playlist on his own.

(2-3) Cubic Structure of List Screen

As described above, on the list display section 102, the user can select any desired music and enter the selected music in a playlist.

On the list display section 102, the music player displays the music text 102A as a candidate object on a layer on the deep side in a virtual display layered structure. This deep layer is referred to as a 2D layer. Further, on the list display section 102, the music player displays the selected object selected from the music text 102A as a candidate object onto a shallow layer in the virtual display layered structure. This shallow layer is referred to as a 3D layer.

As described above, a plurality of display layers are set in a superimposed manner in the depth direction, namely, in the direction of the user's line of sight, of the same screen. In accordance with a user's command for each of these display layers, the display mode of an object displayed on the display layer is changed.

Figure 7:
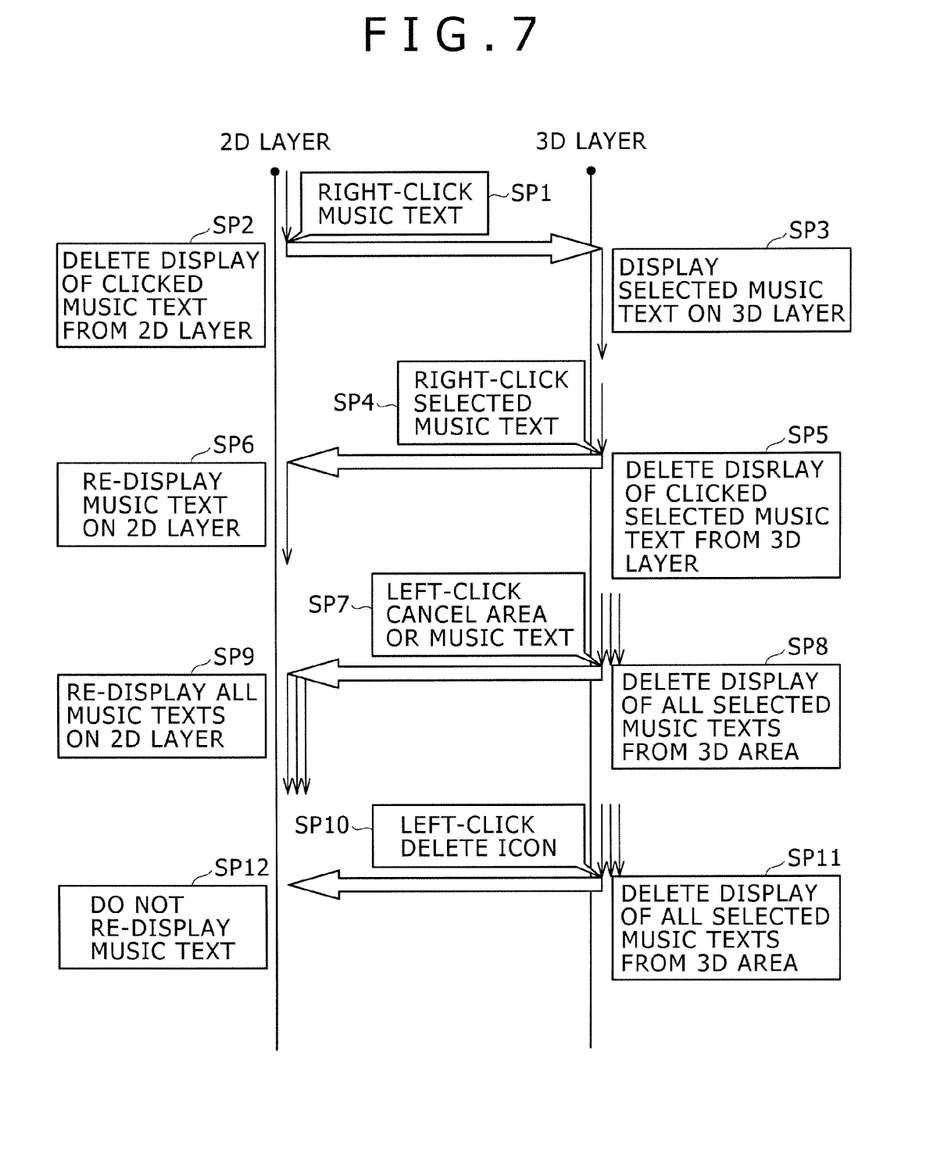
FIG. 7 is a timing chart for describing procedures of selecting, deselecting, and deleting selected music.

The following describes procedures of displaying and selecting objects based on the above-mentioned cubic display with reference to display examples of the main screen 100 and a timing chart shown in FIG. 7.

In selecting a desired music text from a plurality of music texts 102A shown on the list display section 102 and entering the selected music text into a playlist, the user operates the mouse pointer 100A to select the desired music text 102A by clicking the right-button once (hereafter referred to also as "right-clicking music").

Figure 5:
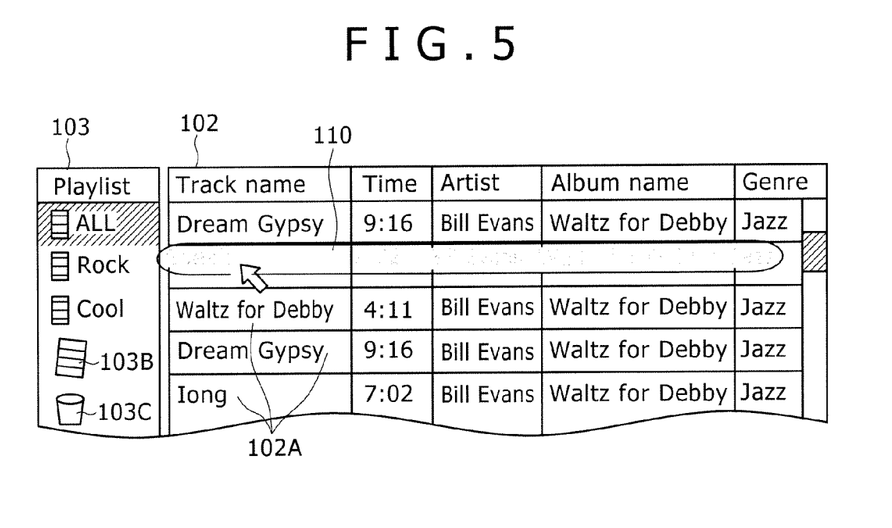
FIG. 5 shows another exemplary screen display for describing a music selecting operation.

Detecting this right-clicking of a music text (step SP1 of FIG. 7), the music player deletes the selected music text 102A from the 2D layer (step SP2 of FIG. 7) and displays a character string having substantially the same contents as those of the deleted music text onto the 3D layer that is shallower than the 2D layer in which the music text 102A is displayed (step SP3 of FIG. 7) as shown in FIG. 5. Consequently, the selected music text 102A is moved from the 2D layer to the 3D layer as a selected music text 110.

At this moment, the music player displays the selected music text 110 at a position slightly offset from the display position of the original music text 102A and, at the same time, displays this selected music text 110 in a slowly swinging manner up and down, thereby making the user recognize as if the selected music text 110 were floating over each music text 102A. This swinging display also makes the user recognize that this selected music text 110 is waiting for a next operation by the user. The size and speed of this swinging display may be small enough for allowing the user to recognize that this selected music text 110 is in front of each music text 102A.

Further, at this moment, the music player displays the selected music text 110 and, at the same time, displays a new playlist creating icon 103B for creating a new playlist and a deleting icon 103C for deleting the selected music onto the 2D layer of a playlist display section 103.

The above-mentioned selection of selected music can be repeated any number of times. Namely, every time a new title of music is selected by right-clicking, the selected music text 110 corresponding to the selected music is displayed on the 3D layer. At this moment, dragging the selected music text 110 by the mouse pointer 100A also allows the change of display positions of the selected music text 110 as desired inside the 3D layer.

(2-4) Displaying 3D Layer During Scrolling

If there are more music texts 102A providing selected objects than can be displayed within the display area of the list display section 102, the unseen music texts 102A can be exposed by scrolling up or down the display contents of the list display section 102 by dragging a scroll pointer 102H through the mouse pointer 100A as described above.

In this scrolling, the music player scrolls only the music texts 102A displayed on the 2D layer, keeping the display position of selected texts 110 on the 3D layer in front of the 2D layer unscrolled.

Figure 6:
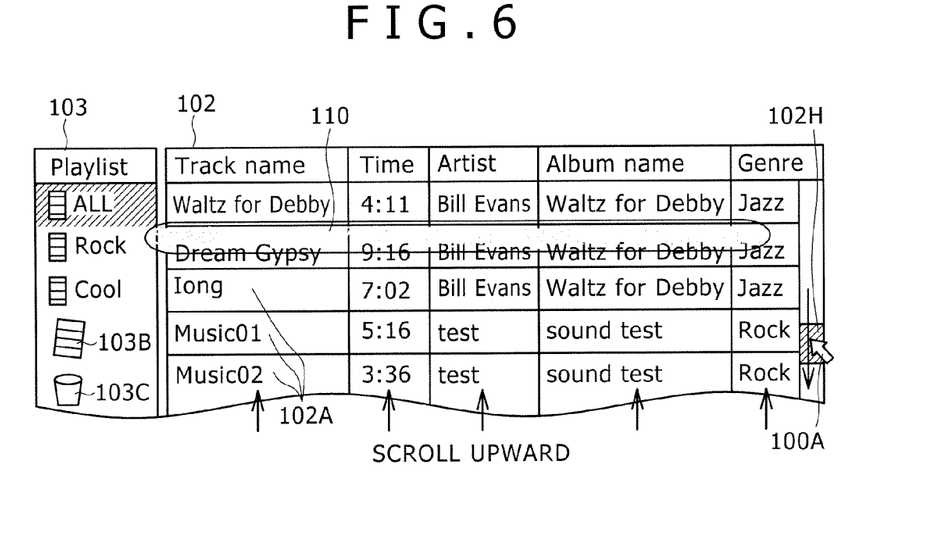
FIG. 6 shows still another exemplary screen display for describing a music selecting operation.

As shown in FIG. 6, for example, dragging the scroll pointer 102H downward scrolls upward the music text 102A displayed on the 2D layer, but does not affects the selected music text 110 on the 3D layer, which therefore is kept unscrolled. Thus, the music player always displays the selected music text 110 as a selected object by means of 3D display.

(2-5) Selection, Deselection, and Deletion of Selected Music Text

Each of the selected music texts 110 selected as described above can be individually deselected or all the selected music texts 110 can be deselected in a batch.

To selectively deselect each individual selected music text 110, the user right-clicks a desired selected music text 110 by use of the mouse pointer 100A. Detecting this "Right-Click Selected Music Text" operation (step SP4 of FIG. 7), the music player as a selective operation control deletes the display of this selected music text 110 from the 3D layer (step SP5 of FIG. 7) and, at the same time, re-displays the music text 102A that is the original of the selected music text 110 onto the 2D layer (step SP6 of FIG. 7). Consequently, the selected music text 110 returns to the music text 102A, being moved from the 3D layer to the 2D layer. This selective deselection of selected music can also be repeated any number of times as long as the selected music text 110 is displayed on the 3D layer.

On the other hand, to selectively deselect all of the selected music texts 110 in a batch, the user left-clicks a free area (or a cancel area) in which no icon is displayed in the playlist display section 103 by use of the mouse pointer 100A or left-clicks the unselected music text 102A.

Detecting this "Left-Click Cancel Area Or Music Text" (step SP7 of FIG. 7), the music player deletes the display of all selected music texts 110 from the 3D layer (step SP8 of FIG. 7) and, at the same time, re-displays the music texts 102A that are the source of the selected music texts 110 onto the 2D layers (step SP9 of FIG. 7). It should be noted that, if all selected music texts 110 are selectively deselected, the music player deletes the new playlist creating icon 103B and the deleting icon 103C from the 2D layer of the playlist display section 103.

In addition, left-clicking the deleting icon 103C in a state in which the selected music text 110 is displayed allows the deletion of the music text 102A that is the source of this selected music text 110 from the list display section 102.

Detecting this "Left-Click Delete Icon" (step SP10 of FIG. 7), the music player deletes the display of each selected music text 110 from the 3D layer (step S11 of FIG. 7) and, at the same time, deletes the display of the music text 102A corresponding to each main screen 100 from the 2D layer (step SP12 of FIG. 7).

(2-6) Searching for Associated Music According to the Present Invention

This music player according to the present invention has an associated music search function for searching the music stored in a music library in the HDD 6 for the associated music associated with the selected music selected by the user, thereby presenting the searched associated music to the user.

This associated music search function allows the user to extract pieces of music that are associated with each other from among many pieces of music stored in each music library.

To start up this associated music search function, the user left-clicks items (track name, artist, and genre, for example) to be set as search keywords in the selected music text 110 selected as the source of search, by use of the mouse button 101A.

Figure 8:
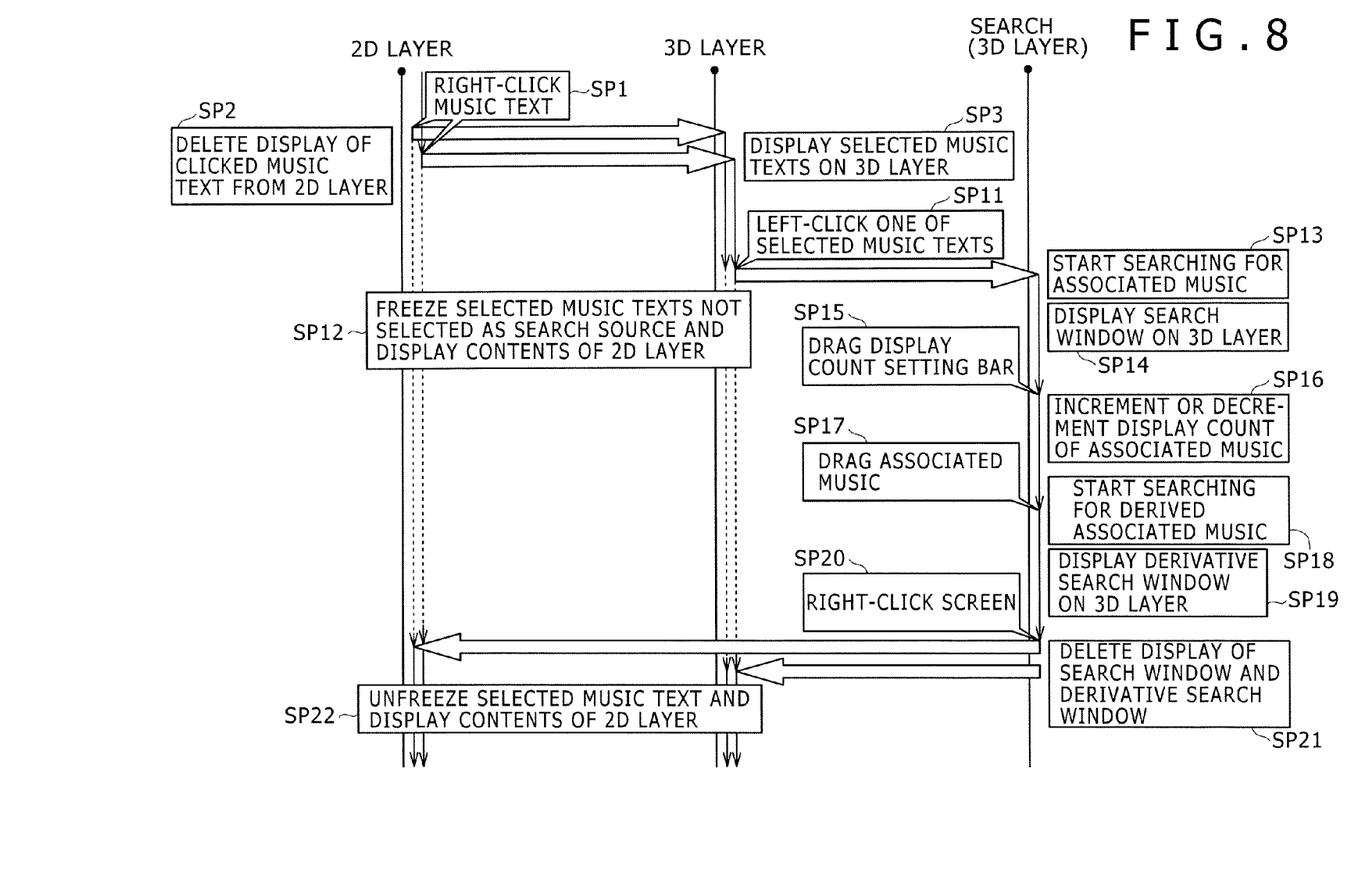
FIG. 8 is a timing chart for describing a processing procedure of search functions.

Detecting this "Left-Click One of Selected Music Text" (step SP11 of FIG. 8), the music player as a search control freezes the selected music texts 110 not selected as the source of search and all display contents on the 2D layer to reject any operation on these selected music texts 110 and display contents (step SP 12 of FIG. 8) and search the music library for the pieces of music associated with the search keys set above (step SP13 of FIG. 8).

Figure 9:
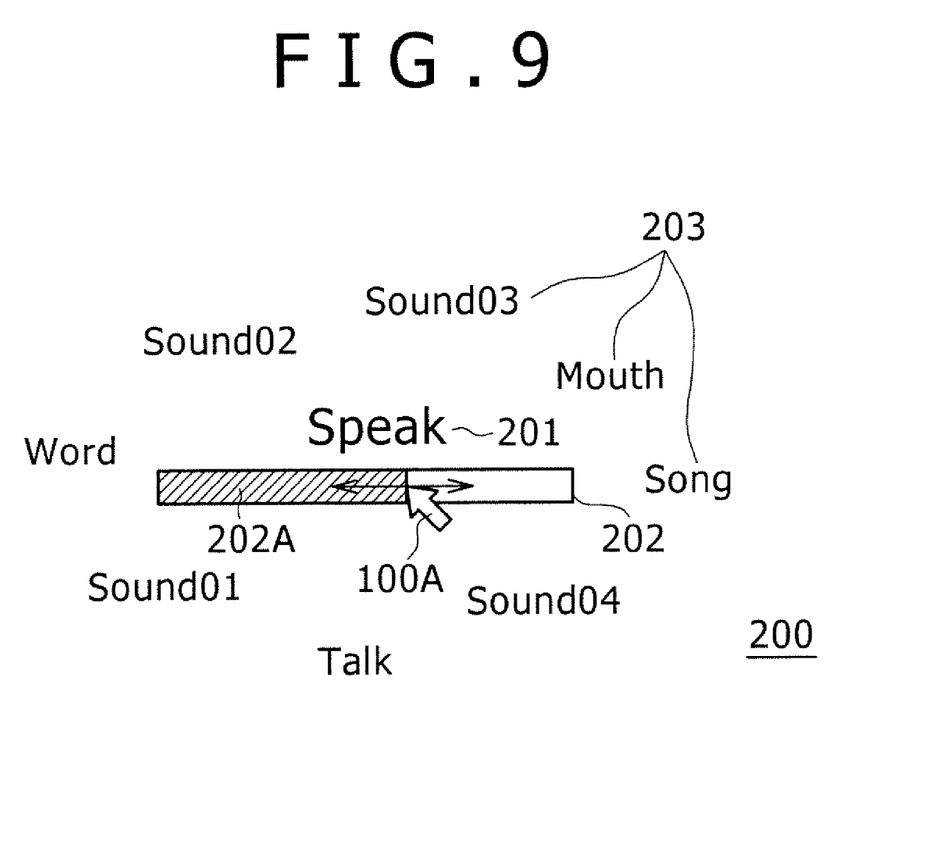
FIG. 9 is a schematic diagram illustrating an exemplary configuration of a search window.

Upon completion of the search operation, the music player as the associated object display means displays a search window 200 shown in FIG. 9 onto the 3D layer of the list display section 102 (step SP14 of FIG. 8). For the associated music to be displayed here, it is assumed that the associated music extracted with the degree of association determined by default beforehand used as a threshold value be already displayed. It should be noted that, in FIG. 9, the music text 102A and so on displayed on the 2D layer are omitted, displaying only the search window 200 on the 3D layer.

The search window 200 shows, at the center thereof, a track name 201 (hereafter referred to simply as a search source track name) of the search source music as a search source object, a bar-shaped associated music display count control section 202 therebelow, and a track name 203 (hereafter referred to simply as an associated track name) of the associated music as an associated object searched from a music library on the basis of the search keyword therearound. It should be noted that the associated track name 203 to be display here may be an associated track name 203 searched with a default degree of association used as a threshold value. It should also be noted that the length of a display count setting bar 202A of the associated music display count control section 202 may be a default length.

(2-7) Increase or Decrease of Associated Track Name Display Count

The associated music display count control section 202 as a display count setting object has the display count setting bar 202A for setting the display count of the associated track name 203 to be displayed on the search window 200 in accordance with the degree of association. One end of this display count setting bar 202A (in this example, the right end) is made movable left and right by dragging through the mouse pointer 101A. In accordance with the length (or the position of the end portion) of the display count setting bar 202A, the music player can increase or decrease the degree of association. For example, if the length of the display count setting bar 202A is made longest (to the right end position for example), the degree is maximized; if the length is made shortest (to the left end position for example), the degree of association is minimized. In accordance with this increase or decrease of the degree of association, the music player increases or decreases the display count of the associated track names 203 to be displayed on the search window 200.

To be more specific, although a total number of eight associated track names 203 are displayed in the state shown in FIG. 9, in order to decrease the display count of associated track names 203 by lowering the degree of association from the total number of eight, the user drags the right-end of display count setting bar 202A to the left to make shorter the display count setting bar 202A. In order to increase the display count of associated track names 203 by raising the degree of association, the user drags the right-end of display count setting bar 202A to the right to extend the display count setting bar 202A.

Upon detection of "Drag Display Count Setting Bar" operation (step SP15 of FIG. 8), the music player decreases, if the display count setting bar 202A is made shorter, the display count of associated track names 203 in accordance with the resultant degree of association and, if the display count setting bar 202A is made longer, increases the display count of associated track names 203 in accordance with the resultant degree of association (step SP16 of FIG. 8).

With the right end of the display count setting bar 202A reached at the right end of the associated music display count control section 202, the music player displays all searched associated track names 203 (namely, the track names of the associated music stored in the RAM 5) on the search window 200. However, if extremely many associated track names 203 have been searched as a search result, it is impracticable to display all on the search window 200, so that the upper limit of the display count of associated track names 203 may be set otherwise.

As described above, the music player according to the present invention allows, with the searched associated track names 203 displayed on the search window 200, the increase or decrease of the display count of associated track names 203 by a simple operation of dragging the display count setting bar 202A of the associated music display count control section 202.

(2-8) Derivative Search of Associated Music

In addition to the above-mentioned configuration, the music player has a derivative search function for repeating the search for other associated music by use of the associated track names 203 displayed in the search window 200 as new search sources (or derivative search source track names). This function allows the search for associated music in a derivative manner.

For the execution of this derivative search function, the user operates the mouse pointer 101A to drag the associated track name 203 selected as a derivative search source music to a desired position on the screen.

Figure 10:
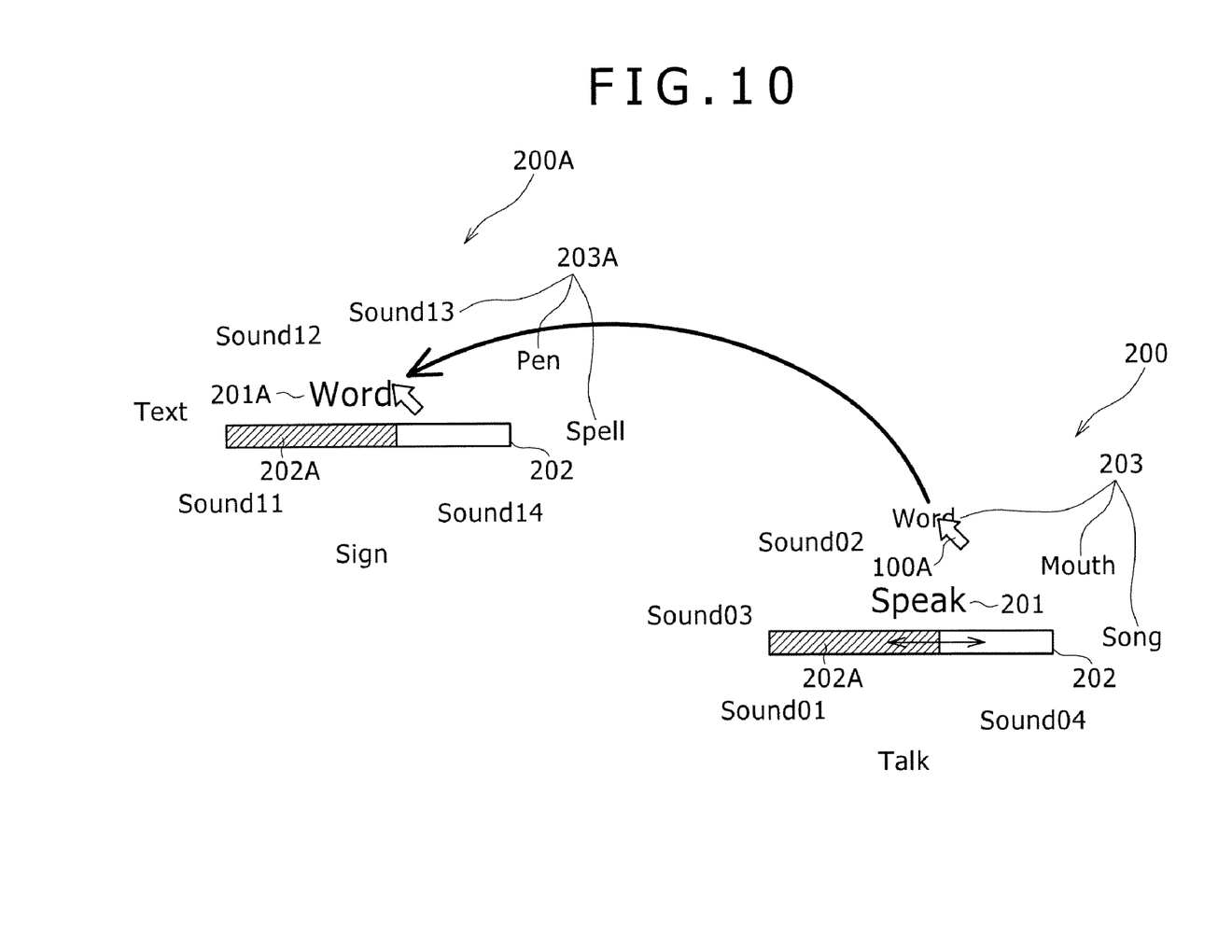
FIG. 10 is a schematic diagram illustrating display states of a derivative search window.
Figure 11:
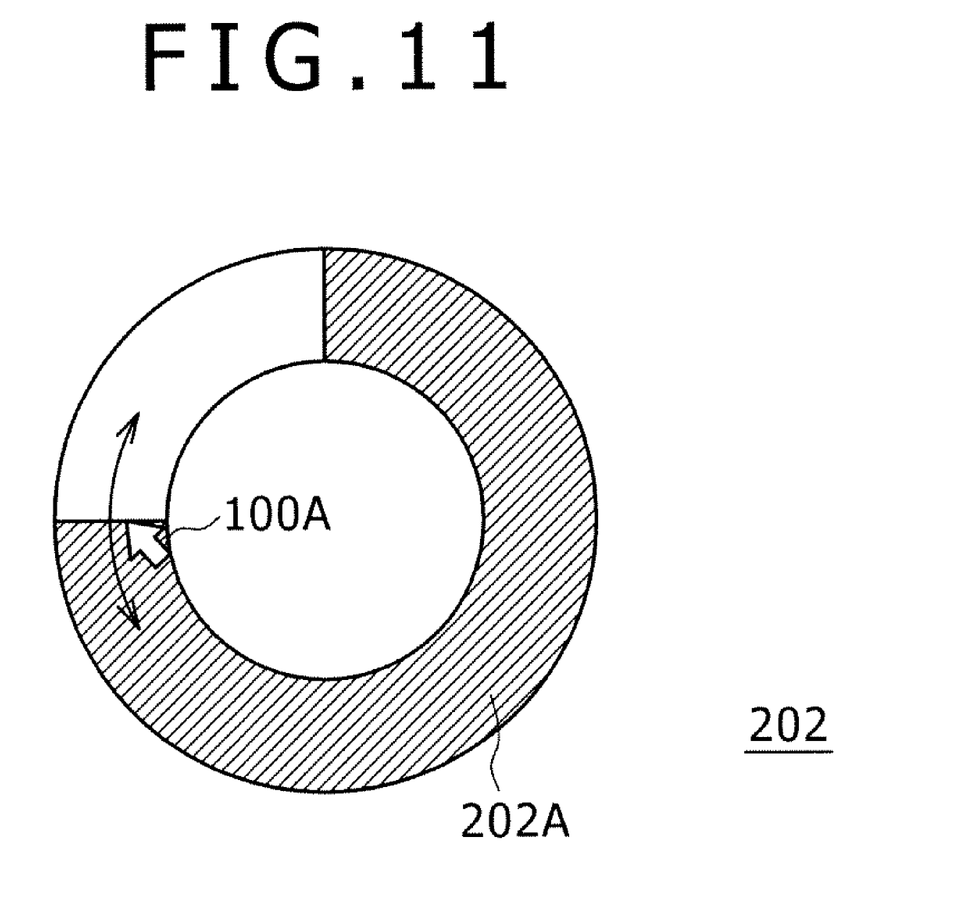
FIG. 11 a schematic diagram illustrating an associated music display count control section practiced as one embodiment of the invention.

Upon detection of "Drag Associated Music" (step SP17 of FIG. 8), the music player as the search section searches the music library for the music associated with the derivative search source music (step SP18 of FIG. 8) and, at the same time, displays a new search window (referred to as a derivative search window 200A) (step SP19 of FIG. 8) as shown in FIG. 10.

This derivative search window 200A has substantial the same configuration as that of the search window 200; namely, the derivative search source track name 201A is display at the center, an associated music display count control section 202 is displayed therebelow, and a track name 203A (hereafter referred to simply as a derivative associated track name) of the derivative associated music searched from the music library is displayed below the derivative search source track name 201A and the associated music display count control section 202.

In the derivative search window 200A, the user can also increase or decrease the display count of derivative associated track names 203A to be displayed in the derivative search window 200A in accordance with the degree of association by dragging through the display count setting bar 202A of the associated music display count control section 202 and, at the same time, open a new derivative search window with the derivative associated track name 203A used as derivative search source music by dragging the derivative associated track name 203A selected as new derivative search source music.

As described above, the music player allows the user to derivatively search for associated music by dragging the associated track names 203 and derivative track names 203A searched by the search function. In addition, the music player allows the user to enter the displayed associated track names 203 and derivative associated track names 203A into a new playlist icon 103A as registered music by dragging these track names to a new playlist creating icon 103B (FIG. 5).

Further, the music player can end the above-mentioned associated music search function by right-clicking any position on the screen with the search window 200 or the derivative search window 200A displayed. Namely, when the music player detects "Right-Click Screen" operation (step SP20 of FIG. 8) with the search window 200 or the derivative search window 200A displayed, the music player deletes the display of the search window 200 or the derivative search window 200A (step SP21 of FIG. 8) and, at the same time, unfreezes (step SP22 of FIG. 8) the display contents (the selected music texts 110 not selected as the search source and all contents displayed on the 2D layer) frozen at the starting of the search function.

(3) Operations and Effects

In the above-mentioned configurations, the music player searches for associated music in response to the left-clicking of the selected music text 110, displays the search source track name 201 and the associated track names 203 associated with the search source track name 201, and increases or decreases the number of associated track names 203 to be displayed in the search window 200 in accordance with the dragging of the display count setting bar 202A of the associated music display count control section 202.

Consequently, the music player can increase or decrease the display count of the associated track names 203 in realtime by dragging the display count setting bar 202A. In addition, on the basis of the length of the display count setting bar 202A displayed on the associated music display count control section 202, the music player allows the user to visually and intuitively recognize how many associated track names 203 can be displayed further.

Also, in response to the dragging of the associated track name 203 in the search window 200, the music player can search derivative associated music with that associated track name 203 used as the derivative association source, thereby displaying the derivative search source track name 201A and the derivative associated track name 203A associated therewith onto the derivative search window 200A.

In addition, in response to the dragging of the derivative associated track name 203A in the search window 200A, the music player can display the searched derivative associated music onto the new derivative search window 200A.

Consequently, the music player can, derivatively, and sequentially search for associated music in realtime by a simple operation of dragging the associated track names 203 and derivative associated track names 203A searched by the search functions.

According to the above-mentioned configurations, the music player can intuitively execute a derivative search operation in realtime by a mouse-based simple operation.

(4) Other Embodiments

In the above-mentioned embodiments, the associated music display count control section 202 shaped like a bar is used, but not exclusively, for setting the display count of associated tracks names; alternatively, any other associated music display count control sections having various forms can be used, such as an associated music display count control section 202 having a circular shape as shown in FIG. 8, for example.

Further, in the above-mentioned embodiments, in displaying the associated track names 203 and derivative associated track names 203A searched as results of search operations, the display forms of the associated track names 203 and the derivative associated track names 203A may be changed in accordance with the degree of association with the search source track name 201 and the derivative source track name 201A.

For example, in the relation between the search source track name 201 and the associated track name 203, the display space between the search source track name 201 and the associated track name 203 is set small for the relatively high degree of association and large for the relatively low degree of association, thereby displaying the associated track name 203 in the proximity of the search source track name 201 for the high degree of association and away from the search source track name 201 for the low degree of association. This setup allows the user to intuitively recognize the degree of association based on these positional relationships. Alternatively, in the association between the search source track name 201 and the derivative search source track name 201A, the display positions thereof can be set for display in accordance with the degree of association.

It is also practicable to set the display density of the associated track name 203 and the derivative associated track name 203A relatively thick for the higher degree of association and relatively thin for the lower degree of association, thereby allowing the user to intuitively recognize the degree of association through the display states of the associated track name 203 and the derivative associated track name 203A.

In the above mentioned embodiments, examples were described in which the present invention is applied to the searching for music content in the music player for reproducing music content; alternatively, the present invention is applicable to various other searching operations, such as the searching for associated information in file management programs and the searching for associated information in the file selecting screens of various programs, for example.

In the above mentioned embodiments, the mouse is used for entering commands of various operations and data associated therewith, thereby executing selecting operations and others by right-clicking, left-clicking, and double-clicking, for example; alternatively, these operations may be effected by use of other input section, such as a track ball and a touch-sensitive panel, for example.

In the above-mentioned embodiments, the CPU 2 of the personal computer 1 executes the music player program that is an information search program to realize the information search method practiced as one embodiment of the present invention; alternatively, the information search method can be realized by any of hardware circuit configurations.

In the above-mentioned embodiments, the CPU 2 of the personal computer 1 executes the music player program that is an information search program to realize the information search program practiced as one embodiment of the present invention; alternatively, this information search program may be realized by installing this information search program into the personal computer 1 from any of various storage media, such as a CD-ROM (Compact Disc-Read Only Memory), a DVD (Digital Versatile Disc), and a semiconductor memory, for example.

While preferred embodiments of the present invention have been described using specific terms, such description is for illustrative purpose, and it is to be understood that changes and variations may be made without departing from the spirit or scope of the following claims.

What is claimed is:

1. An information search apparatus, comprising:
    a search unit configured to search for a first associated object in accordance with a first degree of association with a specified search source object and to search for a second associated object in accordance with a second degree of association with the first associated object, when the first associated object has been pointed at;
    a display unit configured to simultaneously display the first associated object, a first degree-of-association change object for changing the first degree of association, and the second associated object onto a display screen;
    a degree-of-association change unit configured to change the first degree of association in accordance with a first operation executed on the first degree-of-association change object; and
    a display control unit configured to adjust a number of associated objects of the specified search source object in accordance with the change of the first degree of association and to change a display form of the first associated object by said degree-of-association change unit, wherein said display control unit is further configured to display, onto a first display layer in said display screen, a candidate object that provides a candidate for said search unit to search for the first associated object in accordance with the first degree of association, and said display control unit is further configured to display said specified search source object and the first associated object and the first degree-of-association change object onto a second display layer in said display screen, wherein
    said display unit is configured to simultaneously display the first associated object, in accordance with the first degree of association which is changed by said degree-of-association change unit, with said specified search source object and said first degree-of-association change object.

2. The information search apparatus according to claim 1, wherein said display unit is configured to simultaneously display the second associated object and a second degree-ofassociation change object for changing the second degree of association onto said display screen.

3. The information search apparatus according to claim 1, wherein said display control unit is configured to change the display form of the first associated object in accordance with the change of the first degree of association by said first degree-of-association change unit.

4. The information search apparatus according to claim 1, wherein said display control unit is configured to display, onto said display screen, an icon configured to specify a playlist creation including the first associated object.

5. A computer-readable medium including computer-executable instructions, wherein the instructions, when executed by a processor, cause the processor to perform a method of controlling a display of a graphical user interface, the method comprising:

searching for a first associated object in accordance with a first degree of association with a specified search source object;
 searching for a second associated object in accordance with a second degree of association with the first associated object, when the first associated object has been pointed at;
 displaying simultaneously the first associated object, the second associated object, and a first degree-of-association change object for changing the first degree of association onto a display screen;
 displaying, onto a first display layer in said display screen, a candidate object that provides a candidate for said searching to search for the first associated object in accordance with the first degree of association;
 displaying said specified search source object and the first associated object and the first degree-of-association change object onto a second display layer in said display screen;
 changing the first degree of association in accordance with a first operation executed on the first degree-of-association change object;
 adjusting a number of associated objects of the specified search source object in accordance with the change of the first degree of association;
 changing a display form of the first associated object by said changing; and
 displaying simultaneously the first associated object, in accordance with the first degree of association which is changed by said changing, with said specified search source object and said first degree-of-association change object.

6. The information search apparatus according to claim 1, wherein said display unit is configured to display the degree-of-association change object in at least one of a bar shape and a circular shape.

7. The information search apparatus according to claim 6, wherein the first operation is a dragging operation.

8. The information search apparatus according to claim 2, wherein said display unit is configured to simultaneously display the specified search source object, the first associated object, and the second associated object.

9. The information search apparatus according to claim 1, wherein,
 said display unit is configured to display the first associated object at a first distance from the search source object and to display an other associated object at an other distance from said specified search source object, the other associated object having an other degree of association with said specified search source object, and
 the first distance is less than the other distance when the first degree of association is greater than the other degree of association.

10. The information search apparatus according to claim 1, wherein,
 the display unit is configured to simultaneously display the first associated object, the first degree-of-association change object, the second associated object, and a second degree-of-association change object, and
 the degree-of-association change unit is further configured to change the second degree of association in accordance with a second operation executed on the second degree-of-association change object.

11. The information search apparatus according to claim 1, wherein the search unit is further configured to search for the second associated object in accordance with the second degree of association with the first associated object, if the first associated object is urged from a first position on the display screen to a second position on the display screen.

* * * * *